US011603964B2

(12) United States Patent
Takami et al.

(10) Patent No.: US 11,603,964 B2
(45) Date of Patent: Mar. 14, 2023

(54) HIGH-PRESSURE TANK

(71) Applicant: TOYOTA JIDOSHA KABUSHIKI KAISHA, Toyota (JP)

(72) Inventors: Masayoshi Takami, Hamamatsu (JP); Yoshihiro Nakata, Okazaki (JP); Yasunori Nosaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/148,672

(22) Filed: Jan. 14, 2021

(65) Prior Publication Data

US 2021/0254787 A1 Aug. 19, 2021

(30) Foreign Application Priority Data

Feb. 19, 2020 (JP) .............................. JP2020-025889

(51) Int. Cl.
*F17C 1/16* (2006.01)

(52) U.S. Cl.
CPC ........ *F17C 1/16* (2013.01); *F17C 2201/0109* (2013.01); *F17C 2203/012* (2013.01);
(Continued)

(58) Field of Classification Search
CPC ............... F17C 1/16; F17C 2201/0109; F17C 2203/012; F17C 2203/0604;
(Continued)

(56) References Cited

U.S. PATENT DOCUMENTS

| 2007/0068957 A1* | 3/2007 | Oliveira | ................... | F17C 1/10 220/586 |
| 2013/0087567 A1* | 4/2013 | Kaneko | .................... | F17C 1/06 242/430 |

(Continued)

FOREIGN PATENT DOCUMENTS

| CN | 209960209 U | 1/2020 |
| JP | 60-215194 | 10/1985 |

(Continued)

OTHER PUBLICATIONS

MatWeb, "Overview of materials for Epoxy Cure Resin," retrieved from https://www.matweb.com/search/datasheet_print.aspx?matguid=956da5edc80f4c62a72c15ca2b923494 (Year: 2022).*

(Continued)

*Primary Examiner* — John K Fristoe, Jr.
*Assistant Examiner* — Laura E. Parker
(74) *Attorney, Agent, or Firm* — Finnegan, Henderson, Farabow, Garrett & Dunner, LLP

(57) ABSTRACT

A high-pressure tank includes: a liner including a body portion having a tubular shape and side end portions each having a dome shape, the side end portions being provided on opposite sides of the body portion; and a reinforcement layer made of fiber reinforced resin covering an outer surface of the liner. The reinforcement layer includes a tubular member covering the body portion and dome members joined to opposite sides of the tubular member so as to (Continued)

cover the side end portions. The liner includes a first resin layer defining a storage space for storing gas and a second resin layer provided between the first resin layer and at least the tubular member. An elastic modulus of a second resin constituting the second resin layer is lower than an elastic modulus of a first resin constituting the first resin layer.

2 Claims, 14 Drawing Sheets

(52) U.S. Cl.
CPC .............. *F17C 2203/0604* (2013.01); *F17C 2203/066* (2013.01); *F17C 2203/0624* (2013.01); *F17C 2203/0663* (2013.01); *F17C 2209/2163* (2013.01); *F17C 2209/232* (2013.01); *F17C 2221/012* (2013.01); *F17C 2270/0184* (2013.01)

(58) Field of Classification Search
CPC ........ F17C 2203/0624; F17C 2203/066; F17C 2203/0663; F17C 2209/2163; F17C 2209/232; F17C 2221/012; F17C 2270/0184
USPC ......................................................... 220/590
See application file for complete search history.

(56) References Cited

U.S. PATENT DOCUMENTS

| | | | |
|---|---|---|---|
| 2014/0034654 A1* | 2/2014 | Dullaert | C08L 77/06 524/451 |
| 2016/0377228 A1* | 12/2016 | Fratti | F17C 1/00 53/433 |
| 2018/0290537 A1* | 10/2018 | Ueda | B29C 53/602 |

FOREIGN PATENT DOCUMENTS

| | | | | |
|---|---|---|---|---|
| JP | 2017-141947 A | | 8/2017 | |
| JP | 2019206991 A | * | 12/2019 | |
| WO | WO-2018219780 A1 | * | 12/2018 | ........... B29C 70/023 |

OTHER PUBLICATIONS

MatWeb, "Overview of materials for Nylon 66/6," retrieved from https://www.matweb.com/search/datasheet_print.aspx?matguid=26386631ec1b49eeba62c80a49730dc4 (Year: 2022).*
MatWeb, "Overview of materials for Nylon 6," retrieved from https://www.matweb.com/search/DataSheet.aspx?MatGUID=fb48404b7e04433bb3ee3d2a0af922ff (Year: 2023).*
MatWeb, "Overview of materials for Nylon 66," retrieved from https://www.matweb.com/search/datasheet.aspx?matguid=a2e79a3451984d58a8a442c37a226107 (Year: 2023).*

* cited by examiner

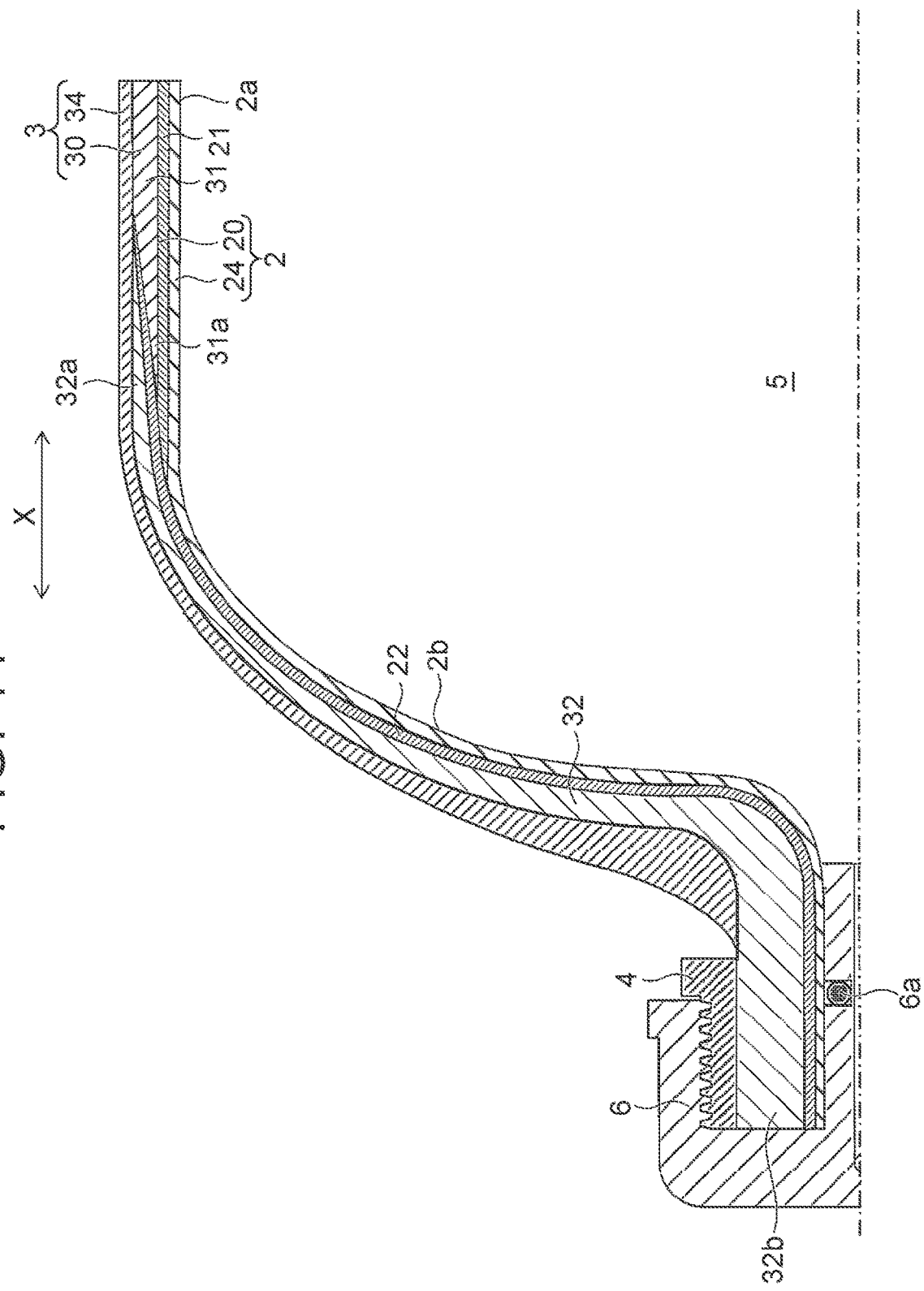

HIGH-PRESSURE TANK

CROSS-REFERENCE TO RELATED APPLICATION

This application claims priority to Japanese Patent Application No. 2020-025889 filed on Feb. 19, 2020, incorporated herein by reference in its entirety.

BACKGROUND

1. Technical Field

The present disclosure relates to a high-pressure tank.

2. Description of Related Art

For example, a high-pressure tank for storing fuel gas is used in a natural gas vehicle, a fuel cell vehicle, and the like. This type of high-pressure tank includes a liner for keeping the fuel gas airtight and a reinforcement layer covering the outer surface of the liner.

As such a high-pressure tank, for example, Japanese Unexamined Patent Application Publication No. 2017-141947 (JP 2017-141947 A) discloses a high-pressure tank including a liner having a tubular body portion and dome-shaped side end portions provided on opposite sides of the body portion. The high-pressure tank is provided with a reinforcement layer made of fiber reinforced resin that covers the outer surface of the liner.

SUMMARY

However, in the high-pressure tank described in JP 2017-141947 A, the resin liner is more easily expanded and contracted than the reinforcement layer made of fiber reinforced resin. When the gas in the tank is adiabatically expanded and compressed due to charging or discharging of the gas during the use of the high-pressure tank, the liner restrained by the reinforcement layer expands and contracts due to thermal change, and the liner may be damaged.

The present disclosure provides a high-pressure tank that can suppress damage to a liner when the liner expands and contracts.

A high-pressure tank according to a first aspect of the present disclosure includes at least: a liner including a body portion having a tubular shape and side end portions each having a dome shape, the side end portions being provided on opposite sides of the body portion; and a reinforcement layer configured to cover an outer surface of the liner and made of a fiber reinforced resin. The reinforcement layer includes a tubular member configured to cover the body portion and dome members joined to opposite sides of the tubular member so as to cover the side end portions. The liner includes a first resin layer defining a storage space for storing gas and a second resin layer provided between the first resin layer and at least the tubular member. An elastic modulus of a second resin constituting the second resin layer is lower than an elastic modulus of a first resin constituting the first resin layer.

According to the above aspect, the body portion of the liner has a two-layer structure of the first resin layer and the second resin layer. Since the elastic modulus of the second resin constituting the second resin layer is lower than the elastic modulus of the first resin constituting the first resin layer, the second resin is softer and more easily deformed than the first resin. Therefore, the second resin layer provided between the first resin layer and at least the tubular member can function as a buffer layer that buffers a thermal stress generated by expansion and contraction of the first resin layer. As a result, it is possible to restrain the first resin layer from being damaged by expansion and contraction of the first resin layer, so the gas can be stably held in the liner.

In the above aspect, the second resin layer may also be provided between the first resin layer and the dome members so as to cover the first resin layer. The expansion and contraction of the liner are likely to occur at boundary portions between the body portion of the liner and the side end portions of the liner. Since the second resin layer serving as a buffer layer is disposed at the side end portions including these boundary portions, damage to the first resin layer can be suppressed more reliably.

According to the present disclosure, it is possible to restrain the liner from being damaged when the liner expands and contracts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a partial sectional view illustrating a second modification of the high-pressure tank shown in FIG. 2.

DETAILED DESCRIPTION OF EMBODIMENTS

Hereinafter, an embodiment of a high-pressure tank 1 according to the present disclosure and a modification thereof will be described with reference to the drawings.

Hereinafter, the high-pressure tank 1 will be described as a tank that is charged with high-pressure hydrogen gas and is mounted on a fuel cell vehicle. However, the high-pressure tank 1 can also be applied to other uses. The gas that can be charged in the high-pressure tank 1 is not limited to high-pressure hydrogen gas, and examples thereof include various compressed gases such as compressed natural gas (CNG), various liquefied gases such as liquefied natural gas (LNG) and liquefied petroleum gas (LPG), and other gases.

1. High-Pressure Tank 1

Figure 1:
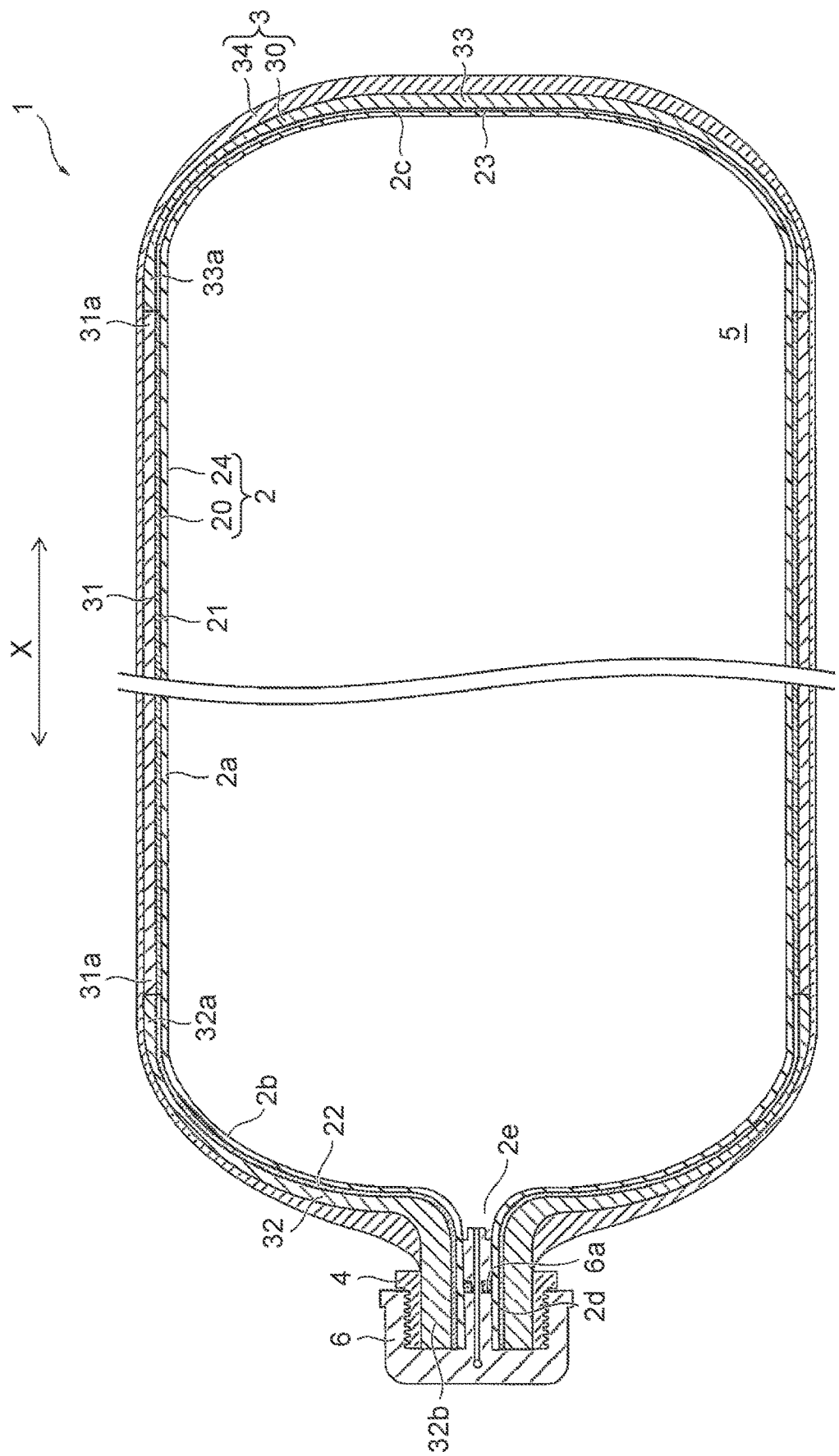
FIG. 1 is a schematic sectional view showing a structure of a high-pressure tank according to an embodiment of the present disclosure.
Figure 2:
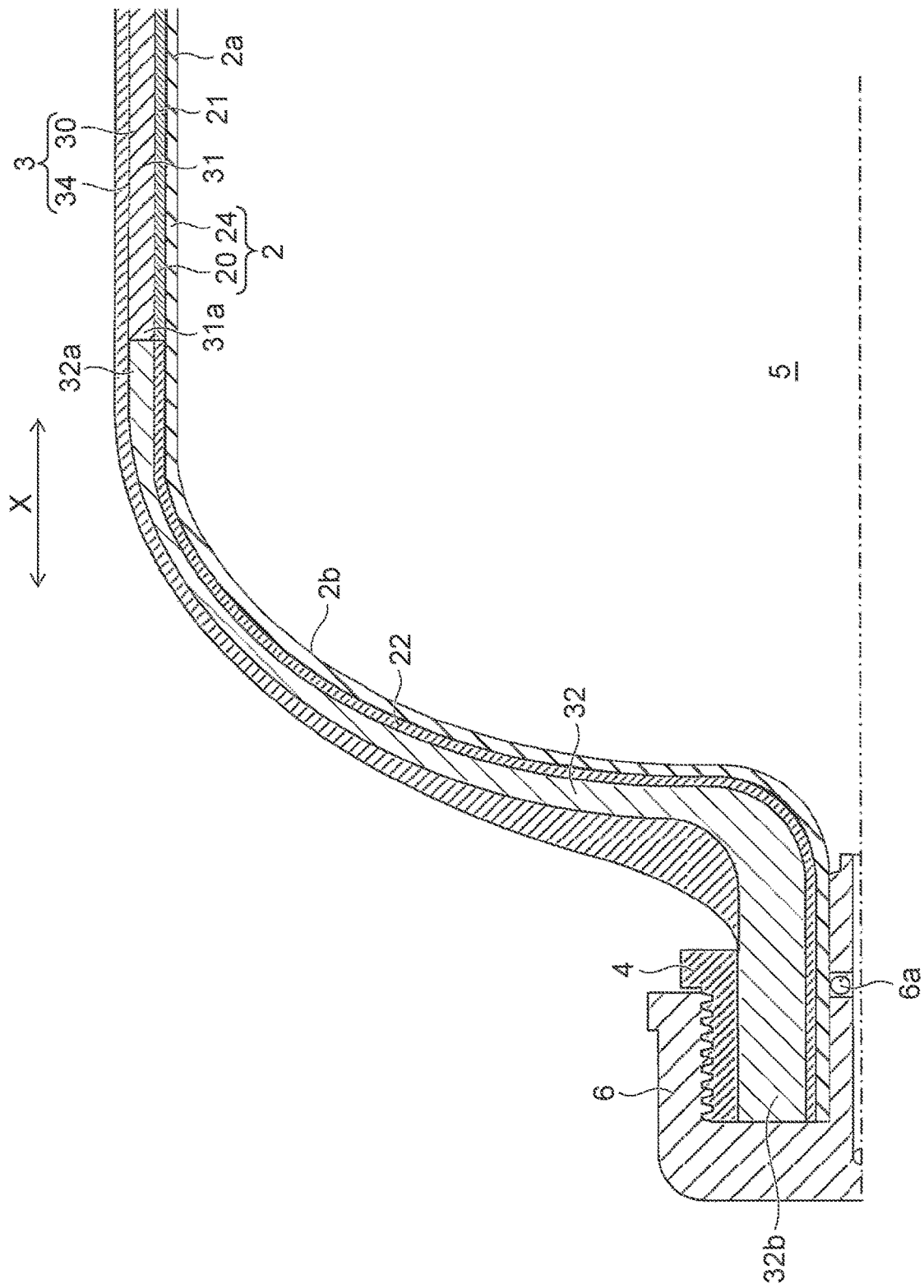
FIG. 2 is a partial sectional view showing the structure of the high-pressure tank shown in FIG. 1.

As shown in FIGS. 1 and 2, the high-pressure tank 1 is a high-pressure gas storage container having a substantially tubular shape, and having rounded ends in a dome shape. The high-pressure tank 1 includes a liner 2 having a gas barrier property, and a reinforcement portion 3 that is made of fiber reinforced resin and that covers an outer surface of the liner 2. The reinforcement portion 3 includes a first reinforcement layer 30 covering the outer surface of the liner 2, and a second reinforcement layer 34 covering an outer surface of the first reinforcement layer 30. An opening is provided at one end of the high-pressure tank 1, and a neck 4 is attached around the opening.

The liner 2 is a resin member that defines a storage space 5 filled with high-pressure hydrogen gas. The liner 2 has a body portion 2a and side end portions 2b, 2c provided on the opposite sides of the body portion 2a. The body portion 2a extends along an axial direction X of the high-pressure tank 1 with a predetermined length and has a tubular shape. The side end portions 2b, 2c are provided so as to be continuous to the respective sides of the body portion 2a and each have a dome shape. The diameters of the side end portions 2b, 2c are each reduced as a distance from the body portion 2a increases, and a tubular portion 2d is provided at the smallest diameter portion of the side end portion 2b. A through hole 2e is provided in the tubular portion 2d.

A neck 4 is made by processing a metal material such as aluminum or an aluminum alloy into a predetermined shape. A valve 6 for charging and discharging hydrogen gas in and from the storage space 5 is attached to the neck 4. The valve 6 is provided with a seal member 6a that is in contact with an inner surface of the liner 2 (first resin layer 24) at a protruding portion 32b of a dome member 32 to be described later and seals the storage space 5 of the high-pressure tank 1.

The reinforcement portion 3 has a function to improve mechanical strength of the high-pressure tank 1, such as rigidity and pressure resistance, by reinforcing the liner 2, and is made of a fiber reinforced resin in which reinforcing fibers (continuous fibers) are impregnated with resin. In the embodiment, as described above, the reinforcement portion 3 includes the first reinforcement layer 30 covering the outer surface of the liner 2 and the second reinforcement layer 34 covering the outer surface of the first reinforcement layer 30. The first reinforcement layer 30 has a tubular member 31 having a tubular shape and covering the body portion 2a of the liner 2, and dome members 32, 33 joined to the opposite sides of the tubular member 31 so as to cover the side end portions 2b, 2c, and is integrally formed of these members. The first reinforcement layer 30 of the embodiment can be regarded as the "reinforcement layer" according to the present disclosure.

The first reinforcement layer 30 is formed by laminating a plurality of fiber reinforced resin layers in which the reinforcing fibers are impregnated with resin. The reinforcing fibers of the tubular member 31 are circumferentially oriented at an angle substantially orthogonal to the axial direction X of the tubular member 31, in other words, the reinforcing fibers of the tubular member 31 are oriented in a circumferential direction of the tubular member 31. The reinforcing fibers of the dome members 32, 33 are not oriented in the circumferential direction of the tubular member 31, and extend from the vicinities of apexes of the dome members 32, 33 toward peripheral edge portions 32a, 33a in various directions intersecting the circumferential direction.

In the embodiment, the reinforcing fibers of the tubular member 31 and the reinforcing fibers of the dome members 32, 33 are not continuous (not connected). This is because, as will be described later, after the tubular member 31 and the dome members 32, 33 are separately formed, the dome members 32, 33 are attached to the opposite ends of the tubular member 31.

As the reinforcing fibers constituting the first reinforcement layer 30 (that is, the tubular member 31 and the dome members 32, 33), glass fibers, aramid fibers, boron fibers, carbon fibers and the like can be used. In particular, it is preferable to use carbon fibers from the viewpoint of light weight, mechanical strength, and the like.

The resin (matrix resin) with which the reinforcing fibers of the first reinforcement layer 30 is impregnated is not particularly limited, and a thermoplastic resin or a thermosetting resin can be used. Examples of the thermoplastic resin include polyetheretherketone, polyphenylene sulfide, polyacrylic acid ester, polyimide, polyamide, nylon 6, and nylon 6,6. Examples of the thermosetting resin include a phenol resin, a melamine resin, a urea resin, an epoxy resin and the like. In particular, it is preferable to use the epoxy resin from the viewpoint of mechanical strength, etc. The epoxy resin has a fluidity in an uncured state and generates a tough cross-linked structure after being thermally cured.

The second reinforcement layer 34 is formed by laminating a plurality of fiber reinforced resin layers in which the reinforcing fibers are impregnated with resin. The second reinforcement layer 34 is provided so as to cover the outer surface of the first reinforcement layer 30. That is, in the embodiment, the second reinforcement layer 34 is a layer that covers the outer surface of the tubular member 31 and the outer surfaces of the dome members 32, 33.

Specifically, the second reinforcement layer 34 is a layer made of a fiber reinforced resin in which fibers are oriented over the two dome members 32, 33. The reinforcing fibers of the second reinforcement layer 34 are oriented so as to be inclined with respect to the axial direction X of the tubular member 31 by helical winding of a fiber bundle impregnated with resin. The dome members 32, 33 can be restrained to the tubular member 31 by the reinforcing fibers. Therefore, when the high-pressure tank 1 is used, it is possible to restrain the dome members 32, 33 from being detached outward from the tubular member 31 along the axial direction X due to the gas pressure.

Examples of the reinforcing fibers constituting the second reinforcement layer 34 include the same materials as those exemplified for the first reinforcement layer 30, and examples of the resin with which the reinforcing fibers are impregnated include the same materials as those exemplified for the first reinforcement layer 30.

In the embodiment, the liner 2 has a two-layer structure of the first resin layer 24 made of a first resin and a second resin layer 20 made of a second resin. Specifically, the liner 2 includes the first resin layer 24 defining the storage space 5 for storing gas and the second resin layer 20 provided between the first resin layer 24 and the first reinforcement layer 30 (reinforcement portion 3). The first resin layer 24 is disposed on the storage space 5 side, whereas the second resin layer 20 is disposed on the first reinforcement layer 30 side of the reinforcement portion 3.

The first resin layer 24 defines the storage space 5 for storing gas, and is a layer for retaining high-pressure gas in the storage space 5. The first resin constituting the first resin layer 24 is preferably a resin having good performance of retaining the charged gas in the storage space 5, that is, good gas barrier property.

The second resin layer 20 is provided between the first resin layer 24 and the first reinforcement layer 30 so as to cover the first resin layer 24. In the embodiment, the second resin layer 20 includes a body region 21 provided between the first resin layer 24 and the tubular member 31 and dome-shaped side end regions 22, 23 provided between the first resin layer 24 and the dome members 32, 33. The side end regions 22, 23 are continuously provided on the opposite sides of the body region 21, and the second resin layer 20 is one continuous layer composed of the body region 21 and the side end regions 22, 23.

Here, in the embodiment, the elastic modulus of the second resin constituting the second resin layer 20 is lower than the elastic modulus of the first resin constituting the first resin layer 24. The elastic modulus here refers to Young's modulus and is a longitudinal elastic modulus. Assuming that the above-mentioned condition of the elastic modulus is satisfied, a thermoplastic resin or a thermosetting resin is exemplified as the first resin constituting the first resin layer 24 and the second resin constituting the second resin layer 20.

Examples of the thermoplastic resin for the first resin and the second resin include a polypropylene-based resin, a nylon-based resin (for example, nylon 6 or nylon 6,6), a polycarbonate-based resin, an acrylic-based resin, an acrylonitrile butadiene styrene (ABS)-based resin, a polyamide-based resin, a polyethylene-based resin, an ethylene-vinyl alcohol copolymer resin (EVOH), a polyester-based resin, and a liquid crystal polymer.

Examples of the thermosetting resin for the first resin and the second resin include a phenol resin, a melamine resin, a urea resin, and an epoxy resin. Here, the relationship between the elastic moduli of the first and second resins is satisfied by selecting different resins from the above-mentioned resins, and for example, the relationship can be satisfied by adjusting additives etc. to be added to the resins (type and amount of a curing agent to be added in the case of the thermosetting resin). For example, in the case of an epoxy resin, the elastic modulus can be adjusted in the range of 1000 MPa to 9000 MPa by adjusting the type and the amount of the curing agent to be added. Thus, the first resin and the second resin can be selected such that the relationship of the elastic modulus is satisfied.

Since the elastic modulus of the second resin constituting the second resin layer 20 is lower than the elastic modulus of the first resin constituting the first resin layer 24, the second resin is softer and more easily deformed than the first resin. Therefore, the second resin layer 20 provided between the first resin layer 24 and at least the tubular member 31 can function as a buffer layer that buffers a thermal stress generated by expansion and contraction of the first resin layer 24. As a result, it is possible to restrain the first resin layer 24 from being damaged by expansion and contraction of the first resin layer 24, so the gas can be stably held in the liner 2.

In particular, expansion and contraction of the liner 2 are likely to occur even at boundary portions between the body portion 2a of the liner 2 and the side end portions 2b, 2c of the liner 2. Therefore, the second resin layer 20 is preferably provided between the first resin layer 24 and the tubular member 31 as well as between the first resin layer 24 and the dome members 32, 33 so as to cover the first resin layer 24. With such a configuration, the second resin layer 20 serving as the buffer layer is disposed on the side end portions 2b, 2c including the boundary portions, so that damage to the first resin layer 24 is more reliably suppressed. In particular, as a condition in which such an effect is easily exhibited, the difference between the elastic modulus of the second resin and the elastic modulus of the first resin is preferably in the range of 300 MPa to 500 MPa.

Further, the coefficient of linear expansion of the second resin constituting the second resin layer 20 is preferably lower than the coefficient of linear expansion of the first resin constituting the first resin layer 24. With this, the first reinforcement layer 30 made of the fiber reinforced resin, the second resin layer 20 made of the second resin, and the first resin layer 24 made of the first resin are not easily expanded and contracted by heat in this order, whereby shear stress due to thermal expansion and contraction is less likely to occur at an interface between the first resin layer 24 and the second resin layer 20. For example, when the second resin is an epoxy resin (coefficient of linear expansion of 4.5 to $6.5 \times 10^{-5}$/K), nylon 6 (coefficient of linear expansion of 5.9 to $10 \times 10^{-5}$/K) and nylon 6,6 (coefficient of linear expansion of 8.0 to $10 \times 10^{-5}$/K) can be used as the first resin.

The gas permeability of the first resin is higher than the gas permeability of the second resin. That is, the second resin has a higher gas barrier property than the first resin. Accordingly, when the gas charged in the storage space 5 permeates through the first resin layer 24, the gas that has passed does not accumulate at the interface between the first resin layer 24 and the second resin layer 20, and is discharged from the second resin layer 20 to the outside through the reinforcement portion 3. As a result, it is possible to restrain the first resin layer 24 and the second resin layer 20 from peeling off due to the gas accumulated at the interface between the first resin layer 24 and the second resin layer 20.

The degree of gas permeability of the resin can be specified by measuring the gas permeation amount of the resin according to Japanese Industrial Standards (JIS) K 7126 or the like, for example. The relationship of gas permeability between the first resin and the second resin can be satisfied by appropriately selecting the resins from the above. Further, in the case of a thermoplastic resin, the gas permeability can be set by adjusting the average molecular weight of the monomer, the degree of polymerization of the resin from the monomer to the polymer, and the like. On the other hand, in the case of a thermosetting resin, the gas permeability can be set by adjusting the average molecular weight of uncured thermosetting resin and the type and amount of the curing agent.

It is preferable that the first resin constituting the first resin layer 24 and the second resin constituting the second resin layer 20 have solubility parameter (SP) values close to each other. Here, the SP value represents a solubility parameter, and the closer the SP values of the resins are, the higher the compatibility (affinity) is. In the embodiment, it is more preferable that the difference (absolute value) in SP value between the resins of the first resin layer 24 and the second resin layer 20 is 7 or less.

By setting the difference in SP value to 7 or less, the compatibility between the first resin layer 24 and the second resin layer 20 is enhanced, and adhesion between the first resin layer 24 and the second resin layer 20 is improved. With the improved adhesion, it is possible to restrain the first resin layer 24 and the second resin layer 20 from peeling off due to the difference in amount of expansion and contraction between the first resin layer 24 and the second resin layer 20 that is caused by temperature change, when the high-pressure tank 1 is used. For example, in the case of an epoxy resin, the SP value is in the range of 9.7 to 10.9, in the case of nylon 6, the SP value is about 11.6, and in the case of nylon 6, 6, the SP value is 13.6. Thus, by selecting these resins as the first resin and the second resin, the SP values can satisfy the above-mentioned relationship.

The relationship of the SP value between the first resin and the second resin can be satisfied by appropriately selecting the first resin and the second resin from the resins exemplified above. For the thermosetting resin, a desired SP value can be set by adjusting the type and amount of the curing agent to be added, which is contained in the thermosetting resin and the like. On the other hand, for the thermoplastic resin, a desired SP value can be set by adjusting the average molecular weight and the like.

For example, when the resin constituting the fiber reinforced resin of the first reinforcement layer 30 is an epoxy resin, the second resin of the second resin layer 20 is an epoxy resin, and the first resin of the first resin layer 24 is preferably nylon 6 or nylon 6,6. With this, not only the relationship of the elastic modulus between the first and second resins described above is satisfied, but also the relationships of the linear expansion coefficient, the SP value, and the like between the first and second resins are easily satisfied. In addition to this, when the second resin of the second resin layer 20 is nylon 6,6, the first resin of the first resin layer 24 is preferably nylon 6.

In the second resin layer 20, the body region 21 and the side end regions 22, 23 may be made of the same type of second resin, and alternatively, the body region 21 and the side end regions 22, 23 may be made of different types of second resin.

2. Manufacturing Method of High-Pressure Tank 1

Figure 3:
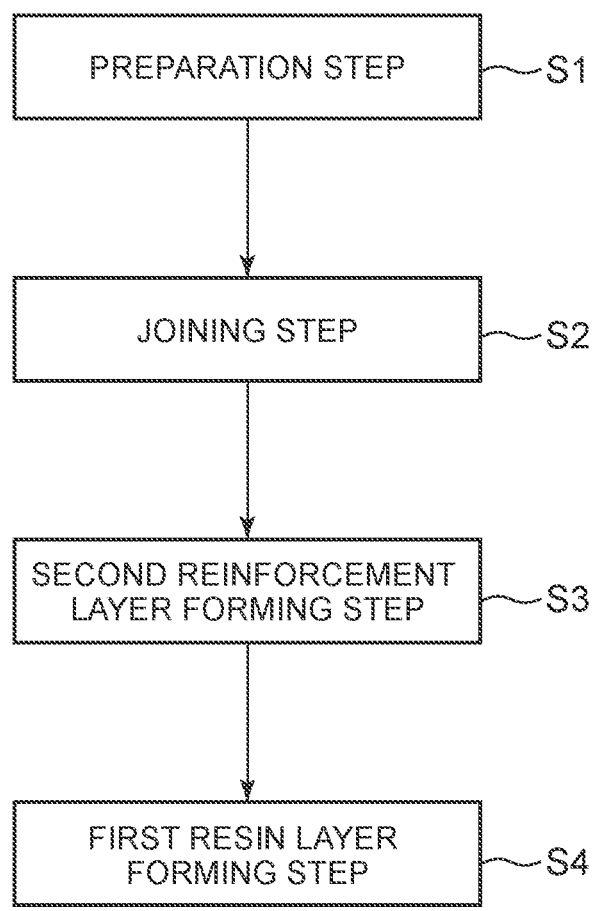
FIG. 3 is a flowchart illustrating a procedure of a manufacturing method of the high-pressure tank according to the embodiment of the present disclosure.

Next, a manufacturing method of the high-pressure tank 1 according to the embodiment will be described. FIG. 3 is a flowchart illustrating a procedure of the manufacturing method of the high-pressure tank 1. As shown in FIG. 3, the manufacturing method of the high-pressure tank 1 includes a preparation step S1, a joining step S2, a second reinforcement layer forming step S3, and a first resin layer forming step S4.

2-1. Preparation Step S1

In the preparation step S1, the tubular member 31 and the dome members 32, 33 coated with the resin layer that serves as the second resin layer 20 may be separately prepared. Alternatively, as described below, the tubular member 31 and the dome members 32, 33 may be separately formed and then coated with a resin layer.

Formation of Tubular Member/Dome Member

Formation of the tubular member 31 and formation of the dome members 32, 33 are performed independently of each other. Therefore, the formation of the tubular member 31 and the formation of the dome members 32, 33 may be performed in parallel, or either of the formations may be performed first. First, a forming method of the tubular member 31 will be described below.

Figure 4:
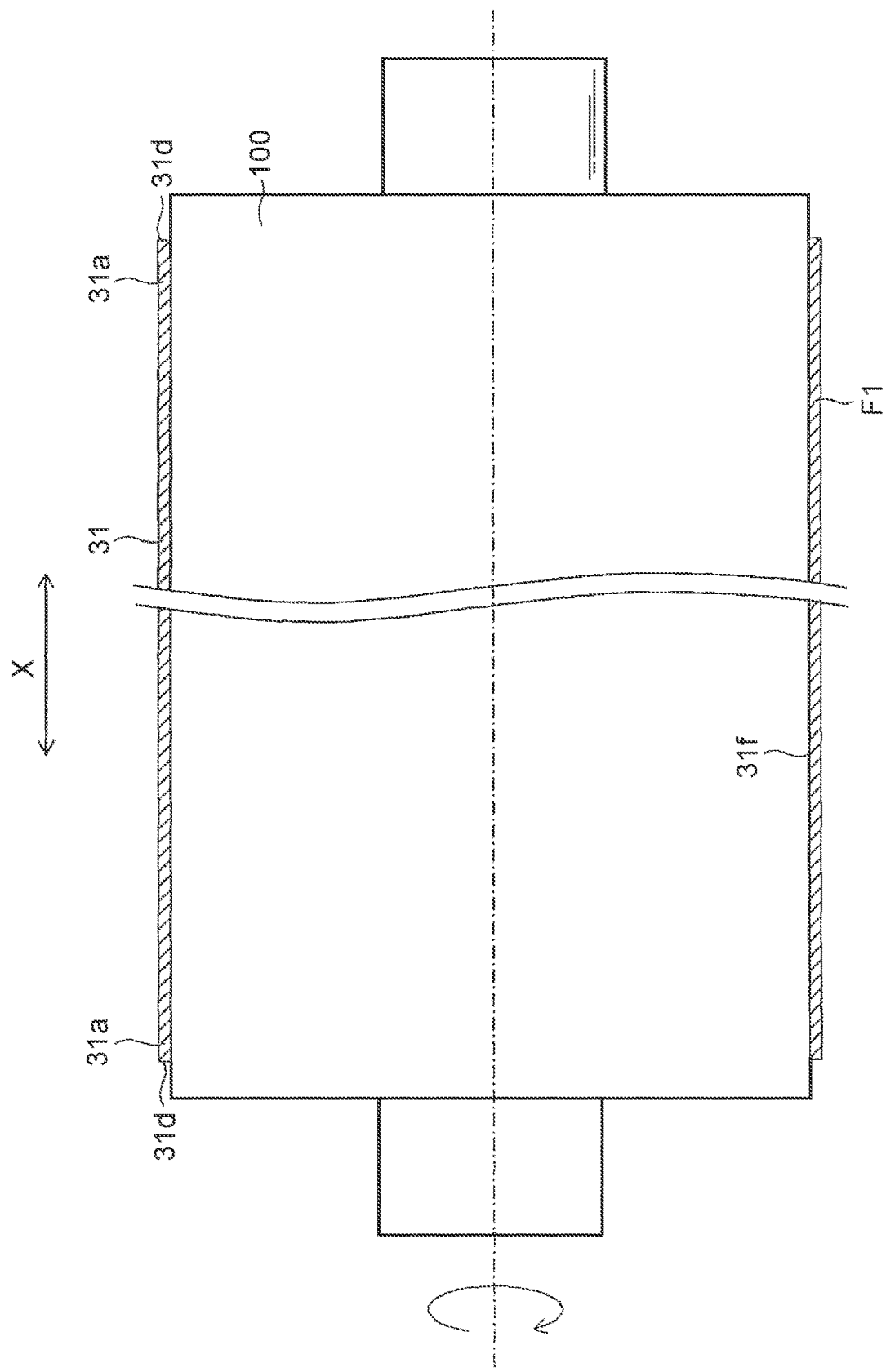
FIG. 4 is a schematic sectional view illustrating a forming method of a tubular member in a preparation step shown in FIG. 3.
Figure 7:
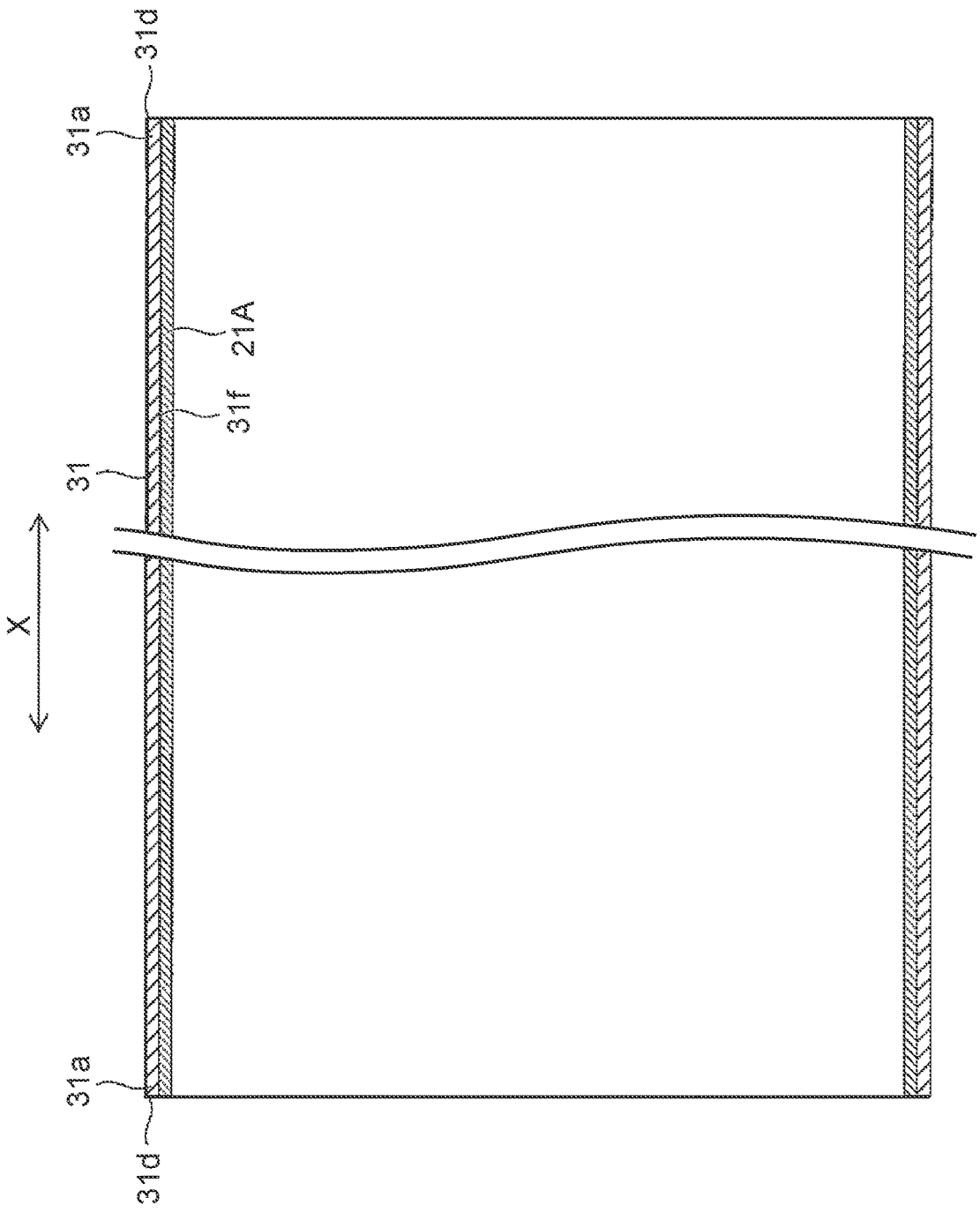
FIG. 7 is a schematic sectional view illustrating a tubular member obtained by coating the tubular member shown in FIG. 4 with a resin layer in the preparation step shown in FIG. 3.

In the forming method of the tubular member 31 shown in FIG. 7, for example, the tubular member 31 is formed by winding a fiber sheet F1 around the outer surface of a columnar mandrel 100, as shown in FIG. 4. An outer diameter of the mandrel 100 corresponds to an inner diameter of the tubular member 31, and also corresponds to a diameter of an inner periphery of each of the peripheral edge portions 32a, 33a of the dome members 32, 33 at its outermost position. The material of the mandrel 100 is not particularly limited. However, the material is preferably a metal in order to secure enough strength to avoid deformation of the mandrel 100 when the fiber sheet F1 is wound.

In formation of the tubular member 31, the fiber sheet F1 that is rolled out is wound around the mandrel 100 a plurality of times while the mandrel 100 is rotated in a circumferential direction by a rotation mechanism (not shown). The fiber sheet F1 is a sheet in which reinforcing fibers aligned in one direction are impregnated with resin. The fiber sheet F1 is wound around the mandrel 100 such that the reinforcing fibers are oriented in the circumferential direction of the mandrel 100. Thus, the tubular member 31 in which the reinforcing fibers are oriented in the circumferential direction is formed.

As the fiber sheet F1, for example, a so-called unidirectional (UD) sheet is used. The UD sheet is a sheet in which a plurality of fiber bundles is aligned in one direction and is woven with a restraint thread. However, a fiber sheet in which a plurality of fiber bundles aligned in a single direction and another plurality of fiber bundles intersecting therewith, e.g., orthogonal thereto are woven may be used.

As the reinforcing fibers of the fiber sheet F1, the same materials as those exemplified for the first reinforcement layer 30 can be used, and examples of the resin with which the reinforcing fiber is impregnated include materials that are the same as those exemplified for the first reinforcement layer 30.

When the resin of the fiber sheet F1 is a thermosetting resin, the fiber sheet F1 wound around the mandrel 100 is heated so that uncured thermosetting resin turn to a completely cured state. Here, the term "completely cured state" means a state in which a polymerization reaction of the uncured thermosetting resin is completed, and the thermosetting resin would not be further cured by heating. However, if the shape retention of the tubular member 31 is ensured, the fiber sheet F1 wound around the mandrel 100 is heated so that the uncured thermosetting resin turns to an incompletely cured state.

Here, the term "incompletely cured state" means a state in which the fluidity of the thermosetting resin is decreased so as to secure the shape retention at a later step as the polymerization reaction of the uncured thermosetting resin progresses by heating. In the following specification, the completely cured state is referred to as full curing, the incompletely cured state is referred to as pre-curing, and the states of full curing and pre-curing are collectively referred to as thermal curing.

Further, when the resin with which the fiber sheet F1 is impregnated is a thermoplastic resin, the thermoplastic resin in a softened state is cooled such that the resin in the fiber sheet F1 is solidified. With the process above, an end surface 31d for abutting is formed on each of peripheral edge portions 31a of the tubular member 31.

After the resin is thermally cured or solidified, the tubular member 31 is removed from the mandrel 100. The shape retention of the tubular member 31 is enhanced by thermal curing or solidification of the resin. Therefore, the tubular member 31 can be easily removed from the mandrel 100, and deformation of the tubular member 31 when the tubular member 31 is removed from the mandrel 100 can be suppressed.

In the embodiment, the example in which the fiber sheet F1 is wound around the outer surface of the mandrel 100 to form the tubular member 31 has been described. However, the tubular member 31 may be formed by hoop winding of a fiber bundle impregnated with resin on the outer surface of the mandrel 100 using a filament winding (FW) process. Alternatively, as another method, the tubular member 31 may be formed by a so-called centrifugal winding (CW) process in which a fiber sheet is attached to an inner surface of the rotating mandrel 100.

Figure 5:
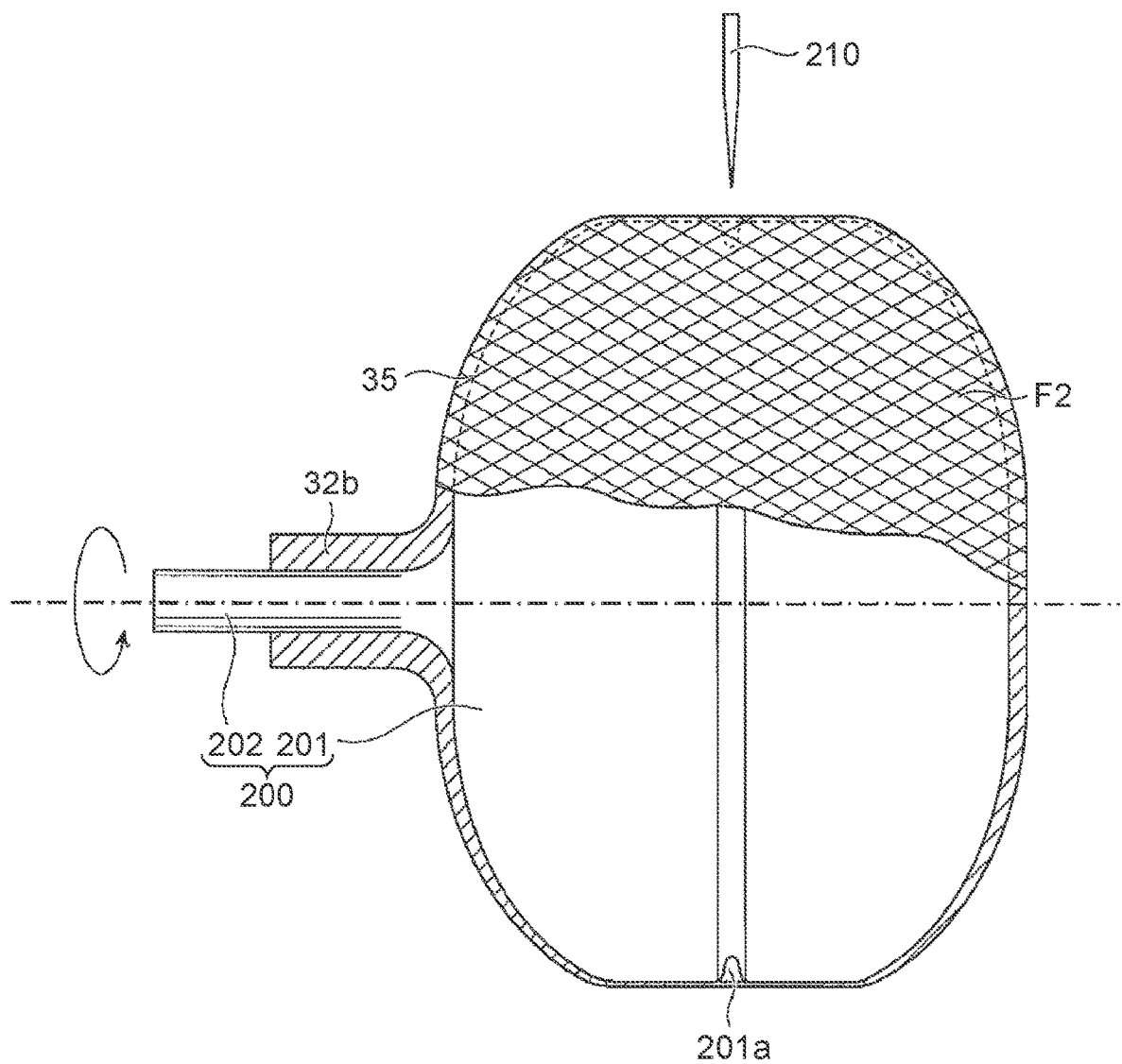
FIG. 5 is a partial sectional view illustrating a forming method of dome members in the preparation step shown in FIG. 3.
Figure 6:
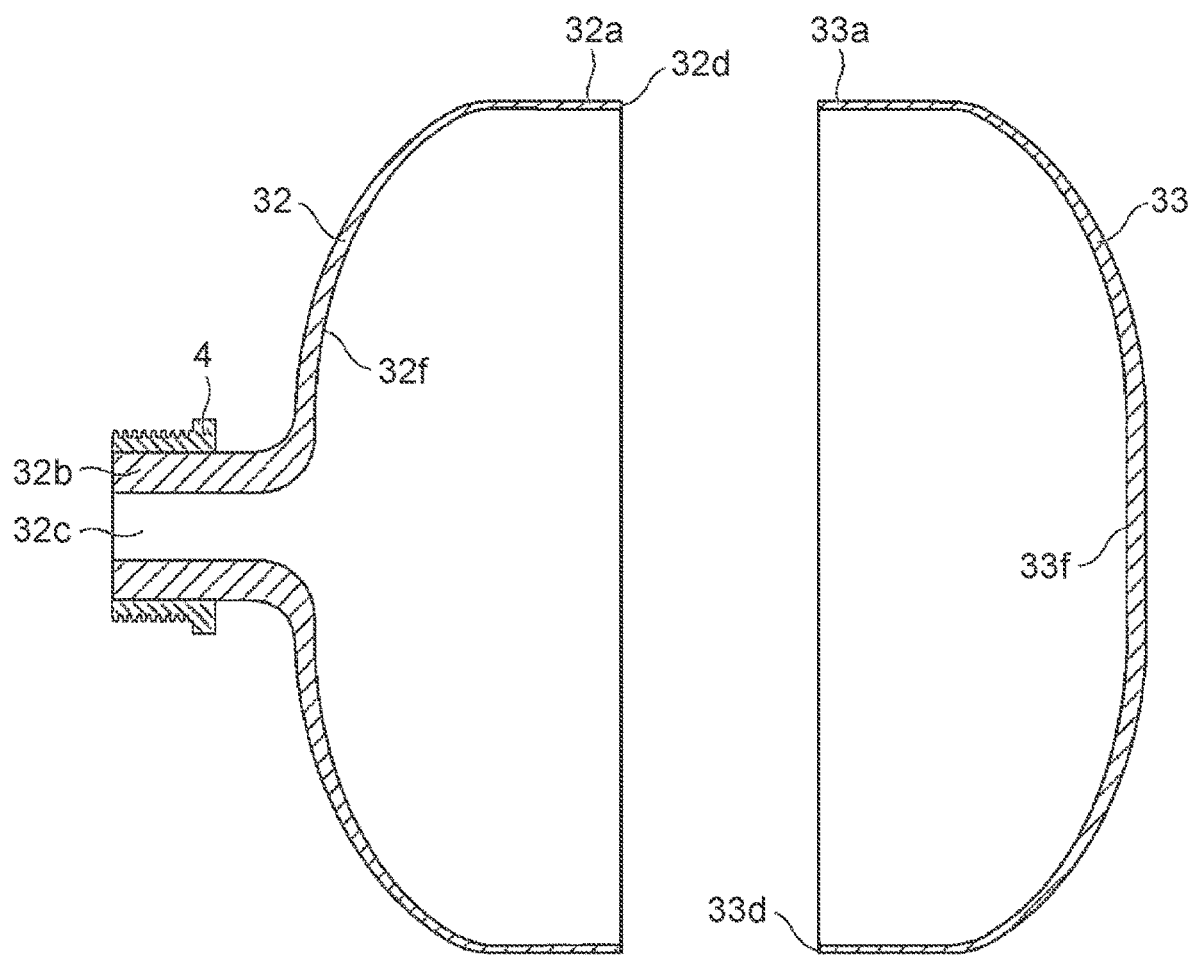
FIG. 6 is a schematic sectional view illustrating the dome members formed in the preparation step shown in FIG. 3.

In the forming method of the dome members 32, 33 shown in FIG. 6, a fiber bundle F2 impregnated with resin is wound around an outer surface of a mandrel 200 by, for example, the FW process, as shown in FIG. 5. Specifically, the mandrel 200 includes a main body portion 201 and a shaft portion 202 extending outward from one end of the main body portion 201.

The main body portion 201 has a circular shape when viewed from an axial direction of the shaft portion 202. An outer peripheral surface of the main body portion 201 at the center in the axial direction is provided with a groove 201a extending over the entire circumference in the circumferential direction. The outer surface of the mandrel 200 has a shape in which the dome-shaped side end portions 2b, 2c of the liner 2 are joined to each other without the body portion 2a, and is provided with the groove 201a at a position corresponding to a seam between the joined side end portions 2b, 2c. The shaft portion 202 is rotatably supported by a rotation mechanism (not shown).

In formation of the dome members 32, 33, first, the mandrel 200 is rotated to wind the fiber bundle F2 such that the fiber bundle F2 covers the outer surface of the mandrel 200, thereby forming a wound article 35. During this process, winding the fiber bundle F2 around the outer surface of the shaft portion 202 provides the tubular protruding portion 32b having a through hole 32c as shown in FIG. 6. The fiber bundle F2 is wound at an angle to intersect with respect to the axial direction of the shaft portion 202, for example, at 30 to 50 degrees. The material of the mandrel 200 is not particularly limited. However, the material is preferably a metal in order to secure enough strength to avoid deformation of the mandrel 200 when the fiber bundle F2 is wound.

As the reinforcing fibers of the fiber bundle F2, the same materials as those exemplified for the first reinforcement layer 30 can be used, and examples of the resin with which the reinforcing fibers are impregnated include materials that are the same as those exemplified for the first reinforcement layer 30. When the resin of the fiber bundle F2 is a thermoplastic resin, the fiber bundle F2 is wound around the mandrel 200 with the thermoplastic resin heated and softened. On the other hand, when the resin of the fiber bundle F2 is a thermosetting resin, the fiber bundle F2 is wound around the mandrel 200 with the thermosetting resin in an uncured state.

Next, the wound article 35 wound around the outer surface of the mandrel 200 is divided into two using a cutter 210 (see FIG. 5). After the process above, as shown in FIG. 5, the divided wound articles 35 are removed from the mandrel 200 to form a pair of the dome members 32, 33.

Specifically, the neck 4 is attached to the outer surface of the protruding portion 32b in the state shown in FIG. 5. When the resin with which the fiber bundle F2 of the wound article is impregnated is a thermosetting resin, the wound article 35 is thermally cured under the conditions (heating temperature and heating time) of the pre-curing or the full-curing. When the resin with which the fiber bundle F2 of the wound article 35 is impregnated is a thermoplastic resin, the thermoplastic resin in the softened state is cooled such that the resin in the fiber bundle F2 is solidified.

With the resin with which the fiber bundle F2 is impregnated being thermally cured or solidified as described above, a blade of the cutter 210 is inserted into the groove 201a of the mandrel 200 while the mandrel 200 is rotated. With the process above, the cutter 210 cuts the fiber bundle F2 such that the wound article 35 can be divided into two. The two dome members 32, 33 are formed by removing the divided wound articles from the mandrel 200. With the process above, ring-shaped end surfaces 32d, 33d for abutting are formed on the peripheral edge portions 32a, 33a of the dome members 32, 33. The cutter 210 is not particularly limited. However, for example, the cutter 210 may be a cutter having a blade on an outer peripheral surface of a rotating disc, a cutter having a blade on a side surface of a thin plate, or a laser cutter that cuts the fiber bundle F2 using a laser light.

The resin with which the fiber bundle F2 is impregnated is cut by the cutter 210 in a state where the resin is thermally cured or solidified. Therefore, deformation of the fiber bundle F2 during cutting is suppressed, and at the same time, deformation of the two dome members 32, 33 when being removed from the mandrel 200 can also be suppressed.

Further, the example in which the resin of the fiber bundle F2 is cut by the cutter 210 in a state where the resin is thermally cured or solidified has been described. However, the resin of the fiber bundle F2 may be cut by the cutter 210 without being thermally cured or solidified. In this case, the fiber bundle F2 may be thermally cured or solidified after being cut by the cutter 210.

In the embodiment, the example in which the fiber bundle F2 impregnated with resin is wound around the outer surface of the mandrel 200 has been described. However, the fiber bundle F2 not impregnated with resin may be wound around the outer surface of the mandrel 200 to form the wound article and the wound article may be impregnated with resin after that.

Further, in the embodiment, the example in which the neck 4 is attached to the outer surface of the protruding portion 32b after the fiber bundle F2 is wound around the outer surface of the mandrel 200 has been described. However, the neck may be attached in advance to a connection portion between the main body portion 201 and the shaft portion 202 of the mandrel 200, and the fiber bundle F2 may be wound around a part of the neck along with the outer surface of the mandrel 200 in that state. In this case, the part of the neck is covered and restrained by the fiber bundle F2. Therefore, the neck can be firmly fixed by the fiber bundle F2.

Coating of Resin Layer

Figure 8:
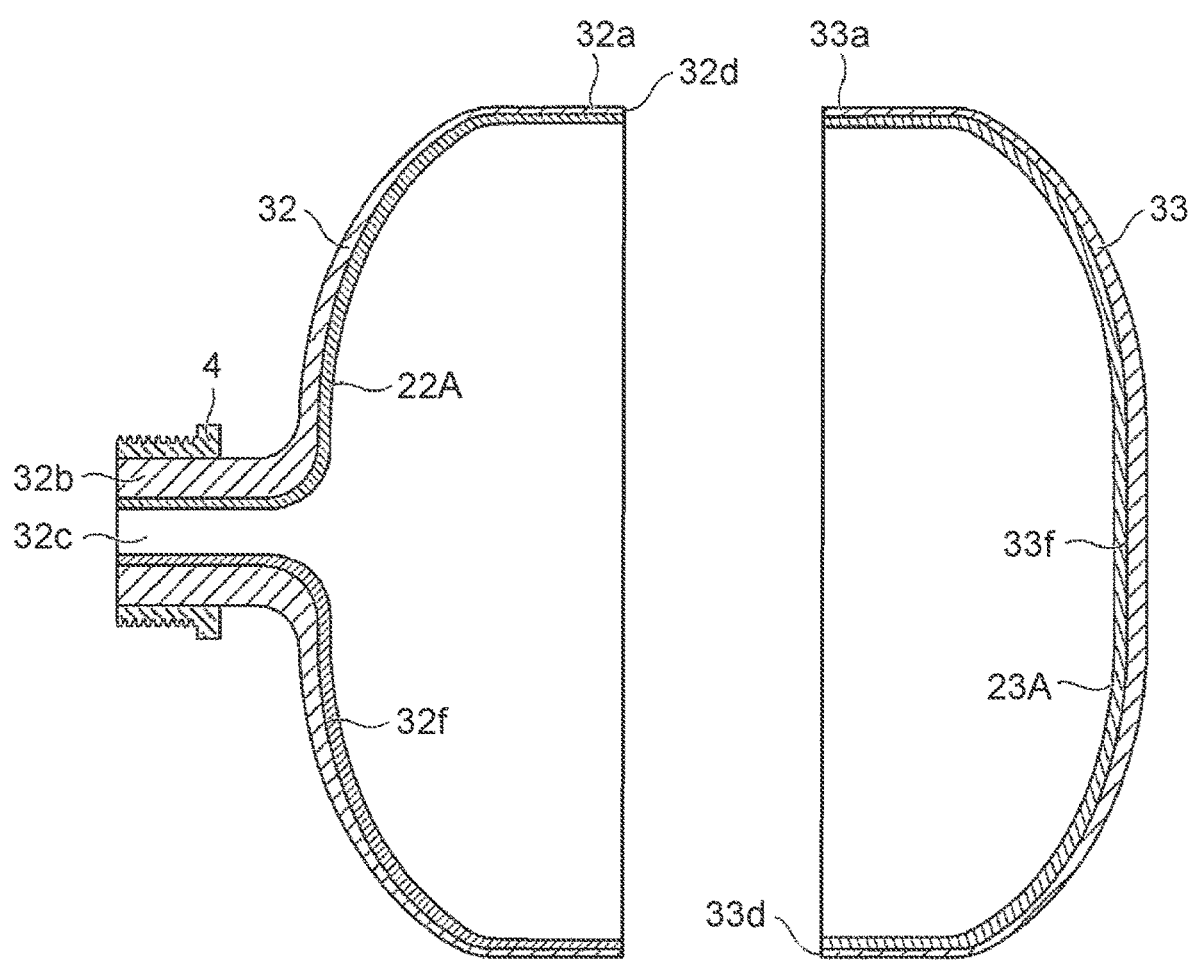
FIG. 8 is a schematic sectional view illustrating dome members obtained by coating the dome members shown in FIG. 6 with a resin layer in the preparation step shown in FIG. 3.

As shown in FIGS. 7 and 8, the inner surfaces of the tubular member 31 and the two dome members 32, 33 formed as described above are coated with resin layers 21A to 23A. The inner surfaces above are contact surfaces 31f to 33f that come into contact with the outer surface of the liner 2, and are surfaces located to the inner side of the high-pressure tank 1. Specifically, as shown in FIG. 7, the resin layer 21A coated on the contact surface 31f of the tubular member 31 corresponds to the body region 21 of the second resin layer 20 shown in FIG. 1. As shown in FIG. 8, the resin layers 22A, 23A coated on the contact surfaces 32f, 33f of the dome members 32, 33 correspond to the side end regions 22, 23 of the second resin layer 20 shown in FIG. 1.

As a forming method of the resin layers 21A to 23A, the resin layer 21A may be formed by applying the liquid or softened second resin to the contact surface 31f, or may be formed by, for example, attaching a sheet made of the second resin. The resin layers 22A, 23A may be formed by applying the liquid or softened second resin to the contact surfaces 32f, 33f, or may be formed by, for example, attaching a sheet made of the second resin.

Examples of the second resin include the same materials as those for the second resin layer 20. In the embodiment, the resin layers 21A to 23A are individually formed, so it is possible to easily use different types of resin for the second resin constituting the resin layers 21A to 23A.

Further, as the forming method of the resin layers 21A to 23A, a two-component mixed type thermosetting resin such as an epoxy resin may be applied to the contact surfaces 31f to 33f and dried to form the resin layers 21A to 23A. In addition to the above, the resin layers 21A to 23A made of a thermoplastic resin such as nylon 6 may be formed by applying a resin containing a thermoplastic resin monomer, such as ε-caprolactam, and a catalyst to the contact surfaces 31f to 33f and heating the applied resin at a temperature equal to or higher than the temperature at which the polymerization reaction of the thermoplastic resin monomer starts.

When the second resin is a thermosetting resin, the thermosetting resin may be uncured, or may be pre-cured by heating such that the thermosetting resin turns into an incompletely cured state. Further, the thermosetting resin may be fully cured by heating such that the thermosetting resin turns into a completely cured state. When the second resin is a thermoplastic resin, the thermoplastic resin is in a solidified state.

In the embodiment, a glass transition temperature (Tg) of the second resin is preferably lower than the Tg of the matrix resin with which the reinforcing fibers of the tubular member 31 and the dome members 32, 33 are impregnated. This enables the resin layers 21A to 23A to be formed at a temperature lower than the Tg of the matrix resin of the tubular member 31 and the dome members 32, 33, so that the shape retention of the tubular member 31 and the dome members 32, 33 can be secured. In the thermosetting resin, a desired Tg can be set by adjusting the type and amount and the like of the curing agent to be added, which is contained in the thermosetting resin. Further, in the case of the thermoplastic resin, a desired Tg can be set by adjusting the average molecular weight of the monomer, the degree of polymerization of the resin from the monomer to the polymer, and the like.

In the embodiment, formation of the tubular member and the dome members and the coating of the resin layer are performed separately. However, for example, formation of the tubular member and the dome members and coating of the resin layer may be performed simultaneously. Specifically, the tubular member 31 may be formed on the resin layer after the resin layer is formed on the surface of the mandrel 100 shown in FIG. 4 using the method described above. Similarly, the dome members 32, 33 may be formed by forming the resin layer on the surface of the mandrel 200 shown in FIG. 5 using the method described above, then forming the wound article 35 on the resin layer, and then cutting the wound article 35.

2-2. Joining Step S2

Figure 9:
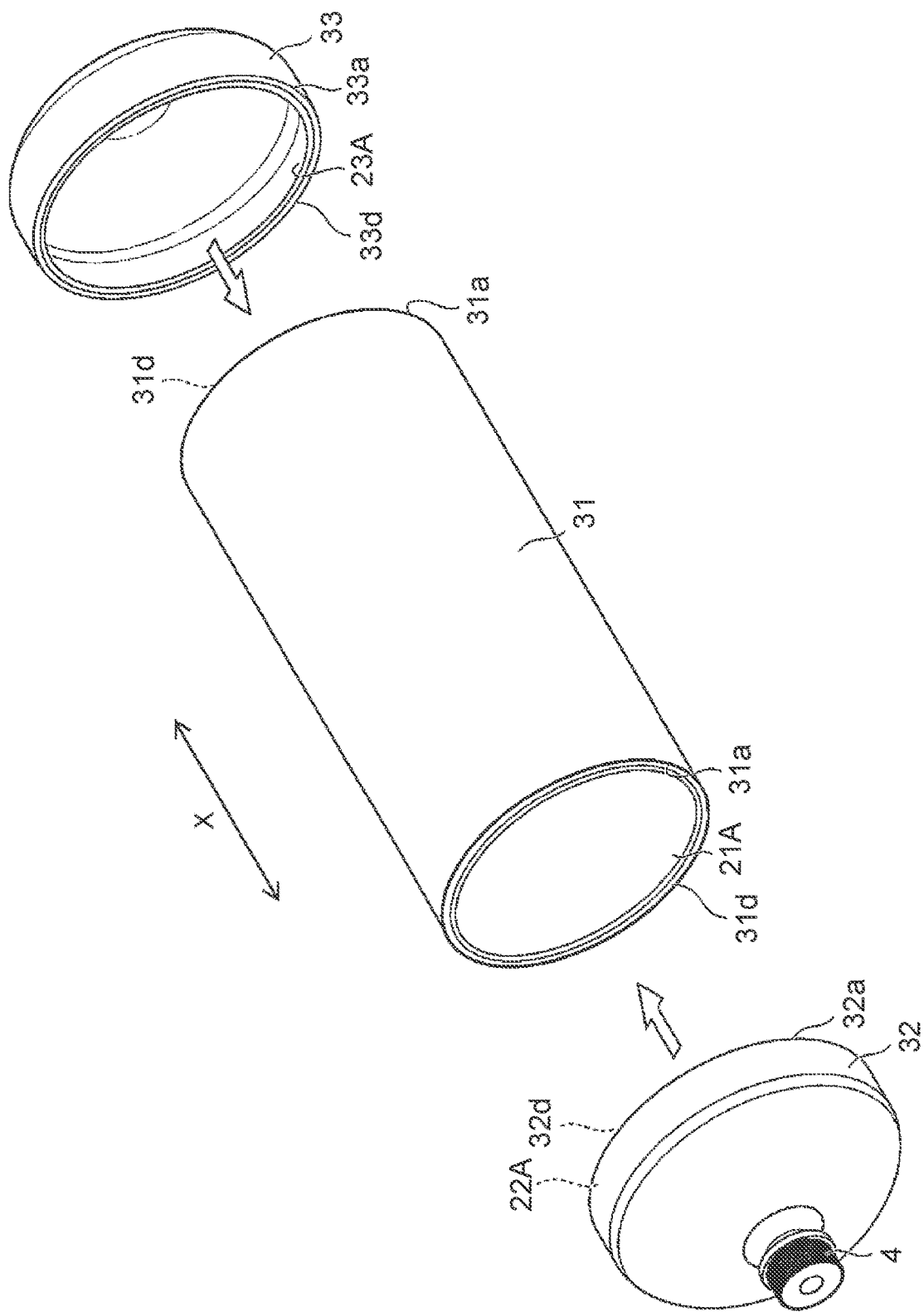
FIG. 9 is a schematic perspective view illustrating a joining step shown in FIG. 3.
Figure 10:
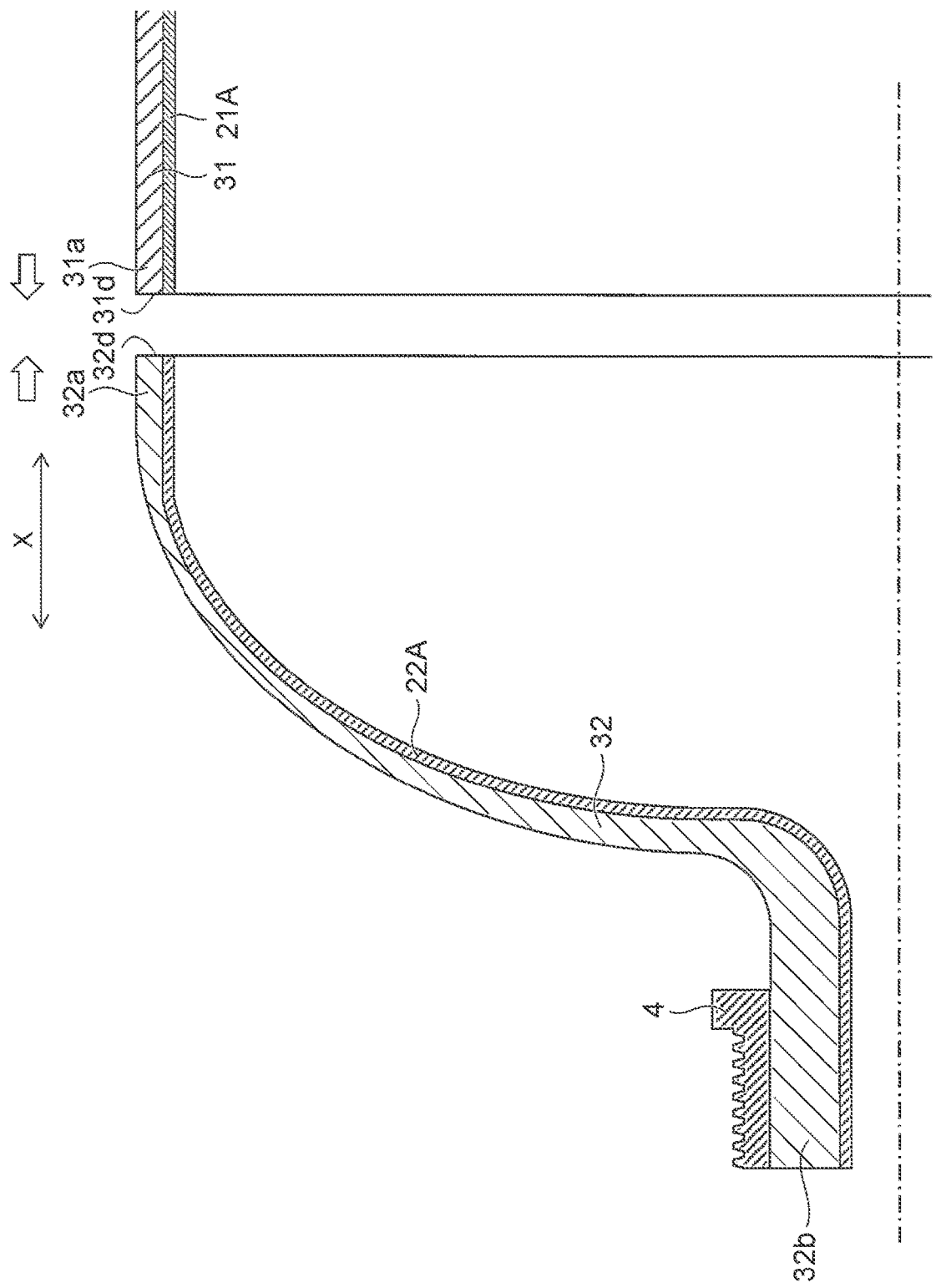
FIG. 10 is a partial sectional view of the dome member and the tubular member, illustrating the joining step shown in FIG. 3.

In the joining step S2, as shown in FIGS. 9 and 10, the peripheral edge portions 31a on the opposite sides of the tubular member 31 and the peripheral edge portions 32a, 33a of the dome members 32, 33 are joined. Further, the resin layer 21A coated on the tubular member 31 and the resin layers 22A, 23A coated on the dome members 32, 33 are joined.

During the joining process above, the tubular member 31 and the dome members 32, 33 are joined to each other and the resin layer 21A and the resin layers 22A, 23A are joined to each other by causing the end surfaces 31d of the peripheral edge portions 31a of the tubular member 31 to abut the end surfaces 32d, 33d of the peripheral edge portions 32a, 33a of the dome members 32, 33.

Figure 11:
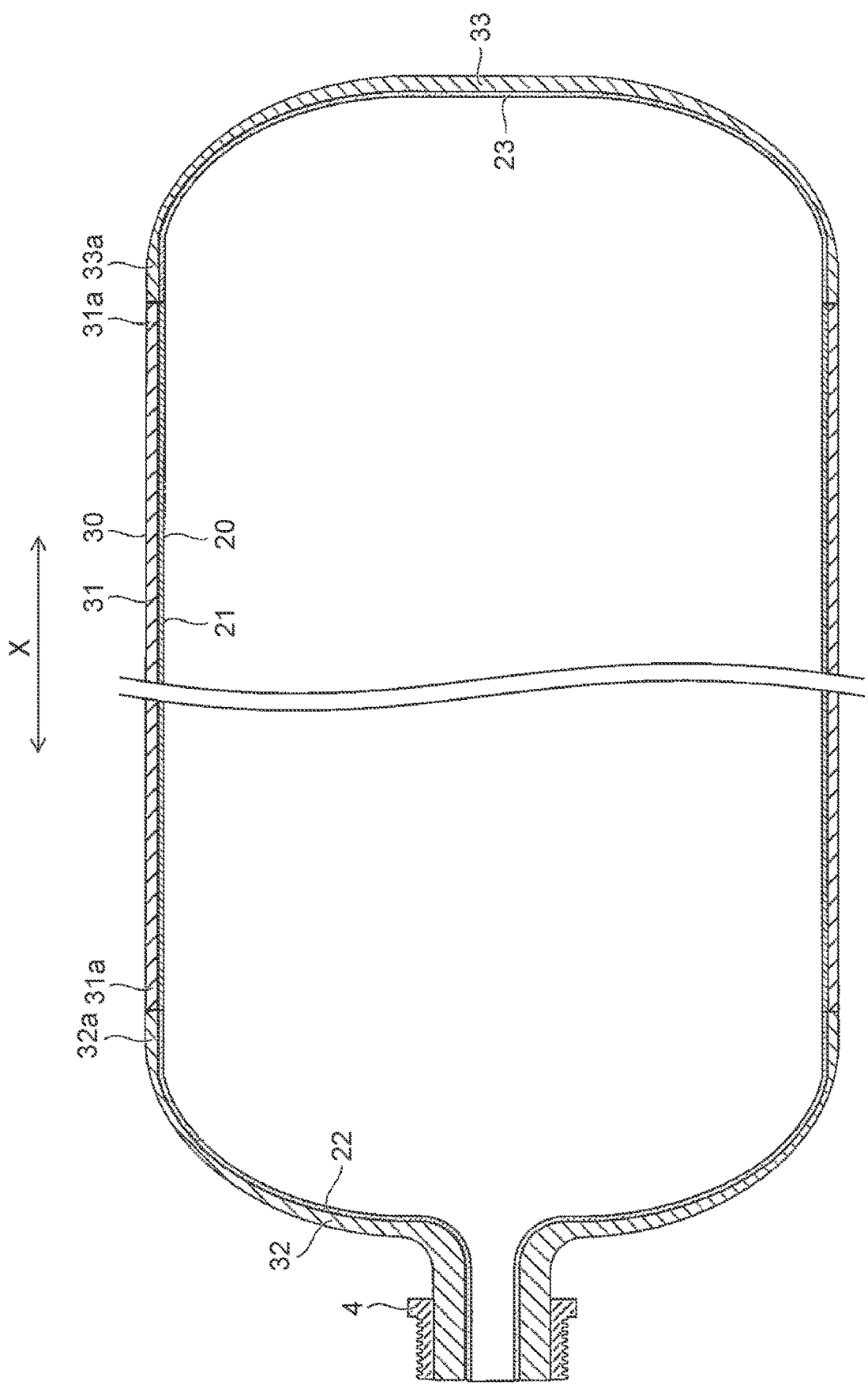
FIG. 11 is a schematic sectional view illustrating a first reinforcement layer and a second resin layer after the joining step shown in FIG. 3.

As a result, as shown in FIG. 11, the first reinforcement layer 30 having the tubular member 31 and the two dome members 32, 33 and the second resin layer 20 having the body region 21 and the side end regions 22, 23 can be simultaneously formed. The resin layer 21A serves as the body region 21 of the second resin layer 20, and the resin layers 22A, 23A serve as the side end regions 22, 23 of the second resin layer 20.

Here, the tubular member 31 and the dome members 32, 33 may be joined using, for example, an adhesive. The adhesive is preferably an adhesive of the same type as the resin of the fiber reinforced resin constituting the tubular member 31 and the dome members 32, 33. In addition to this, when the resin of the fiber reinforced resin constituting the tubular member 31 and the dome members 32, 33 is a thermosetting resin, the tubular member 31 and the dome members 32, 33 may be joined by causing the tubular member 31 and the dome members 32, 33 to abut each other in a state where the thermosetting resin is pre-cured and then fully curing the thermosetting resin by heating, as described above.

When the resin of the fiber reinforced resin constituting the tubular member 31 and the dome members 32, 33 is a thermoplastic resin, the end surfaces 31d of the peripheral edge portions 31a of the tubular member 31 and the end surfaces 32d, 33d of the peripheral edge portions 32a, 33a of the dome members 32, 33 may be heated and then caused to abut each other in a state where the thermoplastic resin is molten so as to be thermally bonded (joined).

The resin layer 21A coated on the tubular member 31 and the resin layers 22A, 23A coated on the dome members 32, 33 may be joined using the adhesive described above. The adhesive is preferably an adhesive of the same type as the resin of the fiber reinforced resin constituting the tubular member 31 and the dome members 32, 33. However, for example, the adhesive may be made of the resin of the same type as the resin of the resin layers 21A to 23A. In addition, when the resin of the resin layers 21A to 23A is a thermosetting resin, the resin layers 21A to 23A may be joined to each other by causing the resin layers 21A to 23A to abut each other in a state where the thermosetting resin is uncured or pre-cured, and then fully curing the thermosetting resin by heating. When the resin of the resin layers 21A to 23A is a thermoplastic resin, respective end portions of the resin layers 21A to 23A may be heated and abutted in a state where the thermoplastic resin is molten so as to be thermally bonded (joined).

2-3. Second Reinforcement Layer Forming Step S3

Figure 12:
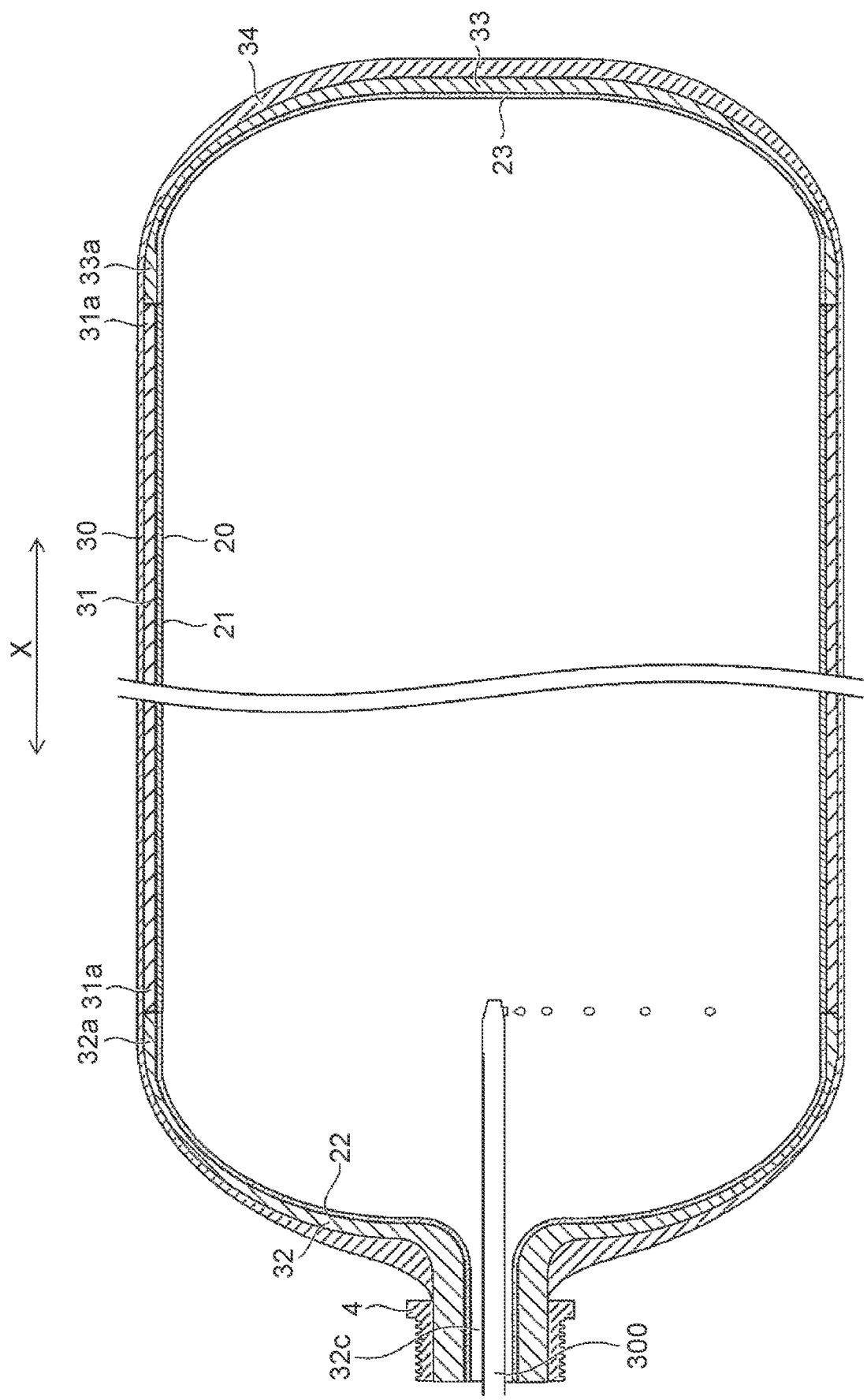
FIG. 12 is a schematic sectional view illustrating a second reinforcement layer forming step and a first resin layer forming step shown in FIG. 3.

In the second reinforcement layer forming step S3, as shown in FIG. 12, the second reinforcement layer 34 is formed so as to cover the outer surface of the first reinforcement layer 30.

In this step, the fiber bundle impregnated with the resin serving as the second reinforcement layer 34 is wound around the surface of the first reinforcement layer 30 in a layered manner by helical winding using the FW process. The helical winding is a winding method by which the fiber bundle is wound over the dome members 32, 33 diagonally (in a range of 10° or more and 60° or less) with respect to the axial direction X of the tubular member 31. The number of layers of the wound fiber bundles is not particularly limited as long as the strength of the second reinforcement layer 34 is ensured. However, for example, the number of layers of the wound fiber bundle is about 2 to 10.

Examples of the reinforcing fibers of the fiber bundle include the same materials as those exemplified for the first reinforcement layer 30, and examples of the resin with which the reinforcing fibers are impregnated include the same materials as those exemplified for the first reinforcement layer 30.

2-4. First Resin Layer Forming Step S4

Next, in the first resin layer forming step S4, as shown in FIG. 12, the first resin layer 24 is formed so as to cover the surface of the second resin layer 20, with the second reinforcement layer 34 in which the resin is uncured or softened being provided so as to cover the surface of the first reinforcement layer 30. The first resin layer 24 is formed by applying the first resin.

The method of applying the first resin is not particularly limited as long as the first reinforcement layer 30 can be formed on the surface of the second resin layer 20. For example, as shown in FIG. 12, a nozzle 300 is inserted through the through hole 32c that communicates the internal space and the external space of the second resin layer 20, and the first resin is ejected from the nozzle 300. At the time of ejection, the nozzle 300 is moved along the axial direction X, and the first reinforcement layer 30 is rotated in the circumferential direction. Thereby, the first resin is applied to the entire surface of the second resin layer 20. After coating, the nozzle 300 is pulled out from the internal space through the through hole 32c. Examples of the first resin include the same resins as those exemplified as the resin constituting the first resin layer 24 described above.

In the embodiment, the glass transition temperature (Tg) of the first resin is preferably lower than the Tg of the second resin constituting the second resin layer 20. Thereby, when the first resin is applied, it is possible to restrain the second resin of the second resin layer 20 that has been fully cured or solidified from being excessively fluidized. As described above, in the thermosetting resin, the desired Tg can be set by adjusting the type and amount of the curing agent to be added, which is contained in the thermosetting resin. Further, in the case of a thermoplastic resin, the desired Tg can be set by adjusting the average molecular weight of the monomer, the degree of polymerization of the resin from the monomer to the polymer, and the like.

When the second resin constituting the second resin layer 20 is an uncured or pre-cured thermosetting resin, the gelling temperature of the first resin is preferably at least 10° C. lower than the gelling temperature of the second resin. This enables the shape of the liner 2 to be easily maintained because the first resin is fully cured first when the first resin layer 24 and the second resin layer 20 are subjected to full curing. From the same viewpoint, it is preferable to use, for the first resin, a resin that is fully cured at the ambient temperature of the second resin layer 20 (specifically, room temperature). When the first resin is applied to the surface of the second resin layer 20, the first resin is cured, so that the shape of the liner 2 can be easily maintained.

When the resin contained in the second reinforcement layer 34 and the first resin are thermoplastic resins, the resins are cooled to be solidified. When the thermoplastic resin includes a thermoplastic resin monomer and a catalyst that polymerizes the thermoplastic resin monomer, the second reinforcement layer 34 and the first resin layer 24 can be formed by heating at a temperature equal to or higher than the starting temperature of the polymerization reaction. On the other hand, when the resin contained in the second reinforcement layer 34 and the first resin are thermosetting resins, the resins are fully cured by heating. When the resins of the first reinforcement layer 30 and the second resin layer 20 are not completely cured, these resins are also subjected to full curing. When the first reinforcement layer 30 and the second resin layer 20 are completely cured, the full curing of the second reinforcement layer 34 and the first resin is preferably performed under a condition that the resin of the first reinforcement layer 30 is not fluidized and a condition that the resin of the second resin layer 20 may be fluidized to some extent but is not excessively fluidized.

When the resin is fully cured or solidified, the inside of the storage space 5 may be pressurized. Thereby, the adhesiveness between the first resin layer 24 and the second resin layer 20 can be improved.

As shown in FIG. 1, by forming the first resin layer 24, it is possible to form the liner 2 having the first resin layer 24 and the second resin layer 20. Further, when the first resin layer 24 is formed, the seams between the body region 21 and the side end regions 22, 23 of the second resin layer 20 are covered with the first resin layer 24. Therefore, the airtightness of the liner 2 can be secured. On the other hand, by forming the second reinforcement layer 34, it is possible to form the reinforcement portion 3 having the first reinforcement layer 30 and the second reinforcement layer 34. Further, by forming the second reinforcement layer 34, it is possible to restrain the dome members 32, 33 on the tubular member 31.

After the second reinforcement layer 34 is formed together with the first resin layer 24 as described above, the high-pressure tank 1 is completed by attaching the valve 6 to the neck 4 as shown in FIG. 1.

In the embodiment, the example in which a fiber bundle is helically wound around the surface of the first reinforcement layer 30 and then the first resin is applied to the surface of the second resin layer 20 has been described. However, a fiber bundle may be helically wound around the surface of the first reinforcement layer 30 after the first resin is applied to the surface of the second resin layer 20.

In the embodiment, the second reinforcement layer 34 and the first resin layer 24 are solidified or fully cured simultaneously. However, either one of the second reinforcement layer 34 and the first resin layer 24 may be solidified or fully cured first, and then, the other may be solidified or fully cured.

Figure 13:
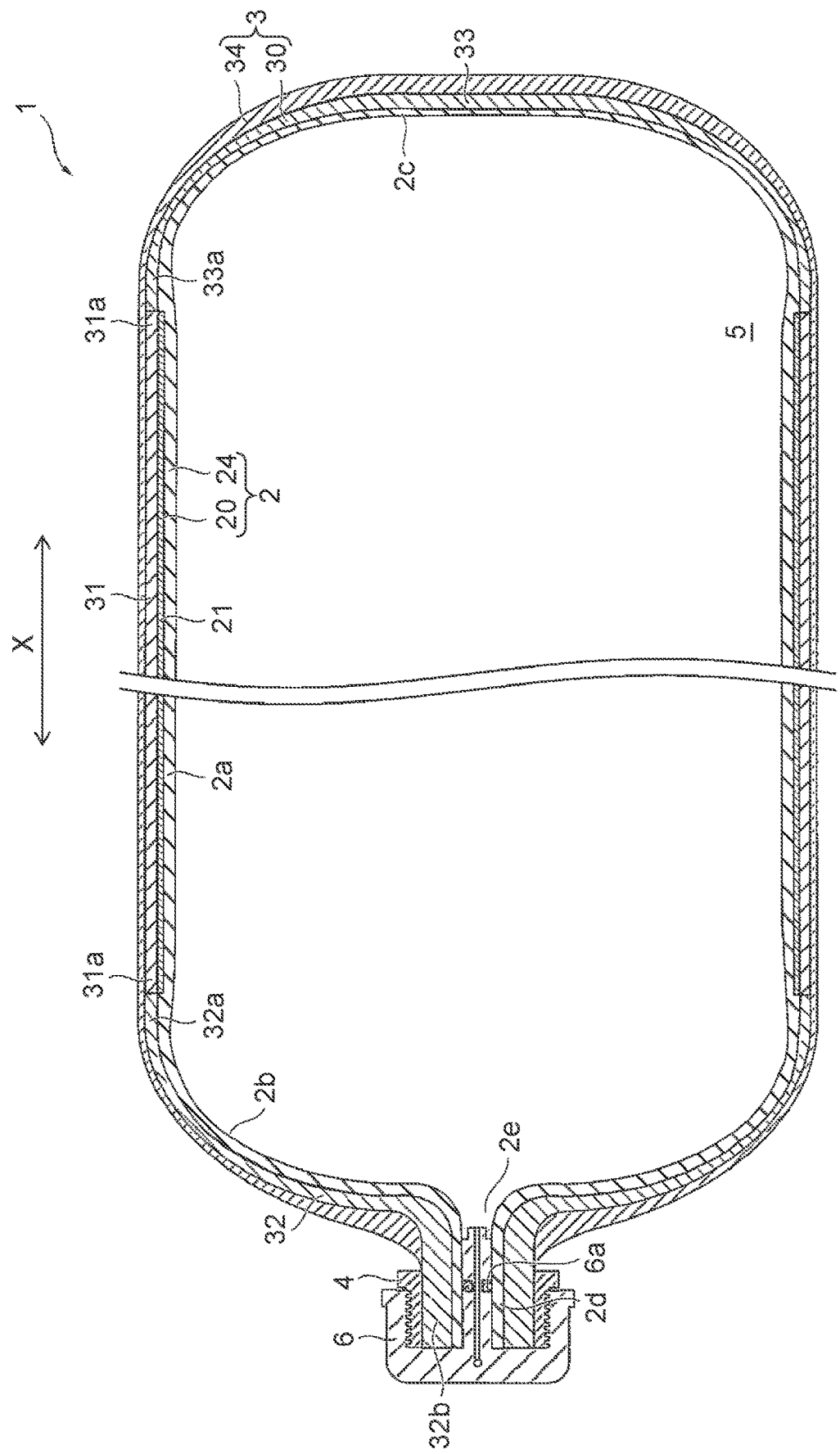
FIG. 13 is a schematic sectional view illustrating a first modification of the high-pressure tank shown in FIG. 1.

FIG. 13 is a schematic sectional view showing a structure of the high-pressure tank 1 according to a first modification of the embodiment. The first modification shown in FIG. 13 differs from the embodiment in that the liner 2 has the second resin layer 20 only on the body portion 2a. Thus, the differences will be mainly described below, and the same members and portions as those in the embodiment are denoted by the same reference signs and detailed description thereof will be omitted.

In the high-pressure tank 1 of the first modification, the liner 2 has a two-layer structure of the first resin layer 24 and the second resin layer 20 provided only between the first resin layer 24 and the tubular member 31. Therefore, the second resin layer 20 is composed of only the body region 21.

The body portion 2a of the liner 2 has a larger surface area than the side end portions 2b, 2c. Therefore, when the liner 2 expands and contracts, the body portion 2a is more easily restrained by the first reinforcement layer 30 than the side end portions 2b, 2c. Accordingly, the body portion 2a is more easily damaged than the side end portions 2b, 2c. Thus, in the first modification, the second resin layer 20 is provided only on the body portion 2a that is easily restrained by the first reinforcement layer 30, so that it is possible to more effectively suppress damage to the first resin layer 24 due to the restraint by the first reinforcement layer 30 when the liner 2 expands and contracts.

The points in which the manufacturing method of the high-pressure tank 1 of the first modification is different from the manufacturing method shown in FIG. 3 described above will be described below. In the preparation step S1 shown in FIG. 3, the dome members 32, 33 prepared are not coated with the resin layers 22A, 23A as shown in FIG. 6. Specifically, after the dome members 32, 33 are formed as shown in FIGS. 5 and 6, the contact surfaces 32f, 33f of the dome members 32, 33 are not coated with the resin layers 22A, 23A. In the joining step S2 shown in FIG. 3, the peripheral edge portions 31a on the opposite sides of the tubular member 31 that is coated with the resin layer 21A and the peripheral edge portions 32a, 33a of the dome members 32, 33 that are not coated with the resin layers 22A, 23A are joined. In the first resin layer forming step S4 shown in FIG. 3, the first resin layer 24 is formed so as to cover the contact surfaces 32f, 33f of the dome members 32, 33 and the surface of the second resin layer 20 (here, the body region 21). In this way, the liner 2 having the first resin layer 24 and the second resin layer 20 provided only between the first resin layer 24 and the tubular member 31 can be formed.

FIG. 14 is a partial sectional view showing a structure of the high-pressure tank 1 according to a second modification of the embodiment. As shown in FIG. 14, the second modification is different from the embodiment in that the peripheral edge portions 31a, 31a of the tubular member 31 and the peripheral edge portions 32a, 33a of the dome members 32, 33 are fitted. Therefore, the differences will be mainly described below, and the same members and portions as those in the embodiment are denoted by the same reference signs and detailed description thereof will be omitted.

In the second modification, the tubular member 31 and the dome members 32, 33 are formed such that thicknesses of the peripheral edge portions 31a, 32a, 33a in the axial direction X are gradually reduced toward their respective distal ends. With such shapes, a step is less likely to be formed in a connection portion between the outer surface of the tubular member 31 and the outer surfaces of the dome members 32, 33 when the peripheral edge portions 31a, 31a of the tubular member 31 and the peripheral edge portions 32a, 33a of the dome members 32, 33 are overlaid on each other.

The points in which the manufacturing method of the high-pressure tank 1 of the second modification is different from the manufacturing method shown in FIG. 3 described above will be described below. In the preparation step S1 shown in FIG. 3, in order to gradually reduce the thickness of both end portions of the tubular member 31 in the axial direction X, the fiber bundle may be woven such that the thickness of the fiber bundle at the end portions of the fiber sheet F1 in the axial direction X (width direction) shown in FIG. 4 gradually decreases, or a winding width of the fiber sheet F1 may be gradually reduced. In addition to this, the thickness may be gradually reduced by pressing both ends of the tubular member 31 in the axial direction X with a roller, etc. The thickness of the peripheral edge portions 32a, 33a of the dome members 32, 33 may also be reduced compared with the thickness of the other portions by pressing the peripheral edge portions 32a, 33a with a roller, etc.

Further, in the joining step S2 shown in FIG. 3, the peripheral edge portions 32a, 33a of the dome members 32, 33 are joined to the peripheral edge portions 31a, 31a of the tubular member 31. Specifically, the peripheral edge portions 31a of the tubular member 31 and the peripheral edge portions 32a, 33a of the dome members 32, 33 are fit, with either the peripheral edge portions 31a or the peripheral edge portions 32a, 33a on the inner side and the other on the outer side. As a result, the joint between the tubular member 31 and the dome members 32, 33 can be further strengthened, so that it is possible to more reliably restrain the dome members 32, 33 and the tubular member 31 from coming off due to gas pressure.

In the second modification, the second resin layer 20 may be formed only between the first resin layer 24 and the tubular member 31, as in the first modification.

Further, although not shown in the drawings, the high-pressure tank 1 according to a third modification of the embodiment may be provided with joining members between the tubular member 31 and the dome members 32, 33. With such a configuration, the adhesiveness between the tubular member 31 and the dome members 32, 33 can be improved, so that the dome members 32, 33 and the tubular member 31 can be more reliably restrained from being separated due to the gas pressure. Further, since the joining members are also provided between the body region 21 and the side end regions 22, 23, the joining members can each function as a sealing material. With this configuration, the airtightness of the high-pressure gas stored in the liner 2 can be improved.

The joining members are disposed between the peripheral edge portions 31a of the tubular member 31 including the body region 21 and the peripheral edge portions 32a, 33a of the dome members 32, 33 including the side end regions 22, 23. The joining member may have a ring shape corresponding to the end surfaces 31d to 33d including the second resin layer 20, or may have a shape that fits the peripheral edge portions 31a and the peripheral edge portions 32a, 33a. The joining member is made of resin, and is preferably made of the same resin as the fiber reinforced resin constituting the tubular member 31 and the dome members 32, 33, or may be made of the same resin as that of the second resin layers 20. In the third modification, the second resin layer 20 may be provided only between the first resin layer 24 and the tubular member 31, as in the first modification.

The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

For example, in the above embodiment, the shape of the body portion of the liner and the tubular member is tubular, but is not limited to the tubular shape as long as the dome members coated with the resin layer can be joined to the opposite ends of the tubular member coated with the resin layer. For example, the body portion of the liner and the tubular member may have an oblong shape (elliptical shape), a polygonal shape, or the like.

For example, in the above embodiment, the example in which the through hole is provided only in one of the dome members and the neck is provided only at one end of the high-pressure tank has been described. However, the present disclosure is not limited to this example, and the through hole may be provided in both the dome members, and the neck may be provided at both ends of the high-pressure tank.

Further, in the above embodiment, the example in which the first reinforcement layer is composed of three members (tubular member and dome members) has been described. However, the present disclosure is not limited to this example. For example, the first reinforcement layer may be composed of four or more members (two or more tubular members and dome members). In this case, after two or more tubular members are joined to each other, the dome members may be joined to the opposite ends of the joined tubular members. Further, after one tubular member is joined to each of the dome members, the tubular members with dome members may be joined together.

What is claimed is:

1. A high-pressure tank comprising:
    a liner including a body portion having a tubular shape and side end portions each having a dome shape, the side end portions being provided on opposite sides of the body portion; and
    a reinforcement layer configured to cover an outer surface of the liner and made of a fiber reinforced resin, wherein:
    the reinforcement layer includes a tubular member configured to cover the body portion and dome members joined to opposite sides of the tubular member so as to cover the side end portions;
    the liner includes a first resin layer defining a storage space for storing gas and a second resin layer provided only between the first resin layer and the tubular member; and
    an elastic modulus of a second resin, consisting of nylon 6,6, constituting the second resin layer is lower than an elastic modulus of a first resin, consisting of nylon 6, constituting the first resin layer, wherein the difference between the elastic modulus of the second resin and the elastic modulus of the first resin is in the range of 300 MPa to 500 MPa.

2. The high-pressure tank of claim 1, wherein
    the reinforcement layer includes a first reinforcement layer having first reinforcing fibers and a second reinforcement layer having second reinforcing fibers,
    the second reinforcement layer covers an outer surface of the first reinforcement layer,
    the first reinforcing fibers are circumferentially oriented at an angle substantially orthogonal to an axial direction of the tubular member, and
    the second reinforcing fibers are oriented so as to be inclined with respect to the axial direction of the tubular member by helical winding of a fiber bundle.

* * * * *